United States Patent
Luu et al.

(10) Patent No.: US 12,457,471 B2
(45) Date of Patent: Oct. 28, 2025

(54) AUTOMATED EVENT WITNESS IDENTIFICATION

(71) Applicant: AT&T Intellectual Property I, L.P., Atlanta, GA (US)

(72) Inventors: Adrianne Luu, Atlanta, GA (US); Robert Moton, Jr., Alpharetta, GA (US); Ryan Schaub, Berkeley Lake, GA (US); Timothy Knezevich, Mentor, OH (US); Barrett Kreiner, Woodstock, GA (US); Wei Wang, Harrison, NJ (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 481 days.

(21) Appl. No.: 17/931,375

(22) Filed: Sep. 12, 2022

(65) Prior Publication Data

US 2024/0089697 A1 Mar. 14, 2024

(51) Int. Cl.
| | |
|---|---|
| *H04W 4/00* | (2018.01) |
| *H04L 67/52* | (2022.01) |
| *H04W 4/02* | (2018.01) |
| *H04W 4/021* | (2018.01) |

(52) U.S. Cl.
CPC ............ *H04W 4/023* (2013.01); *H04L 67/52* (2022.05); *H04W 4/021* (2013.01)

(58) Field of Classification Search
CPC ........ H04W 4/023; H04W 4/021; H04L 67/52
See application file for complete search history.

(56) References Cited

U.S. PATENT DOCUMENTS

| | | | |
|---|---|---|---|
| 2008/0201076 A1* | 8/2008 | Huang .................. | G01S 5/0036 701/469 |
| 2011/0298611 A1* | 12/2011 | Shelton ................ | G08B 25/016 340/539.11 |
| 2012/0150966 A1* | 6/2012 | Fan ....................... | G06Q 10/107 709/206 |
| 2015/0327039 A1* | 11/2015 | Jain ........................ | H04W 4/023 455/404.2 |
| 2023/0063401 A1* | 3/2023 | Braathen ................ | G16H 50/80 |

* cited by examiner

*Primary Examiner* — Erika A Washington
(74) *Attorney, Agent, or Firm* — Guntin & Gust, PLC; John G. Rauch

(57) ABSTRACT

The disclosed technology is directed towards efficiently identifying a first entity (e.g., a user or sensor) as a potential witness to an event. A first dataset describing event time data and event location data of an event are obtained from a first device. A second dataset describing device time data and device location data are obtained via a device associated with a second entity, e.g., a user. By analyzing the first and second datasets, e.g., for time and location intersection, the second entity can be identified as a potential witness to the event, and notified of such. Factors such as line of sight, speed and direction, audio sensing range versus event volume, and the like of the second entity can be used in determining whether the second entity is a likely witness. A witness to a live event can be identified and asked to send in live (e.g., video) evidence.

20 Claims, 15 Drawing Sheets

AUTOMATED EVENT WITNESS IDENTIFICATION

TECHNICAL FIELD

The subject application relates to the identifying of witnesses to an event, and related embodiments.

BACKGROUND

When an event of interest such as a crime, emergency situation, or other type of event (e.g., minor accident) occurs, potential witnesses to the event may not be readily identifiable. In general, to be identified to the appropriate authorities, the witness needs to take the initiative to come forward. In certain situations, witnesses to an event would be willing to come forward, but they did not realize that an event of interest occurred nearby.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
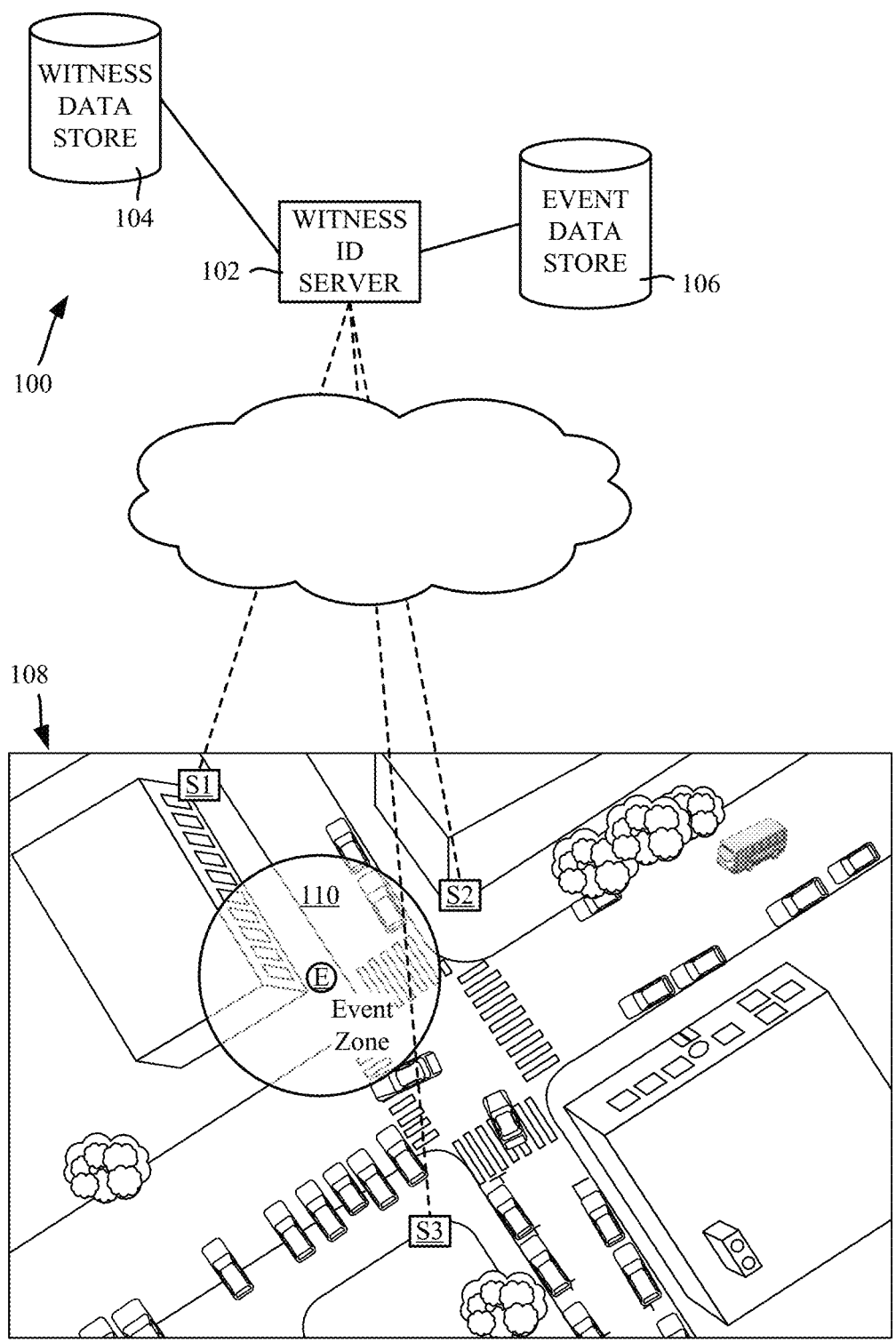
FIG. 1 is a block diagram of an example system and example representation of a zone in which an event occurred, in accordance with various aspects and embodiments of the subject disclosure.

The technology described herein is generally directed towards the identification of potential witnesses to an event, such as an emergency event, a crime, or other event that occurs at (or over) a geographic location or area. The occurrence of the event is detected, and based on detected locations of nearby devices, potential witnesses to the event are identified and notified.

As a result, one or more potential witnesses to an event may be readily identified, including witnesses to an event that did not realize that an event of interest occurred at a time they were nearby the event. For an ongoing event, potential witnesses may be readily identified and notified, as well as requested to assist in obtaining information related to the event, for example to capture and send in live video.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth. Olfactory output as well as taste output and/or tactile output can also be part of a promotional presentation as described herein.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows an example system 100 comprising a witness identification (ID) server 102 coupled to a witness ID data store (e.g., database) 104 and an event data store (e.g., database) 106. As described herein, the witness ID server 102, the witness ID data store 104 and the event data store 106 operate to identify and notify potential witnesses to an event of interest.

As shown in the example (map and/or image) representation 108 of FIG. 1, a geographic area (representing a three-dimensional space) may be equipped with one or more sensors. Three such sensors S1-S3 are depicted in FIG. 1, although it is understood that any number of practical sensors may be present in a given scenario. In general, the sensors S1-S3 have capabilities to sense conditions or occurrences in the area, and collect data describing the conditions or occurrences. For example, such sensors may include cameras (visible light, depth-capable and/or infrared), microphones, motion sensors, vibration sensors, environmental sensors, heat sensors, and others.

Each sensor may be location-aware and may be equipped with communication capabilities so as to be able to send sensor data that the sensor collects, either autonomously or upon request, including to the witness ID server 102. The sensors may be fixed or non-fixed in their location. Fixed sensors can be fixed at a location yet be moveable with respect to their field of view and/or audio sensing direction, for example. Non-fixed sensors may include, for example, sensors transported by drones, by users (such as body cams), by vehicles (such as dashboard cams), and others.

FIG. 1 also depicts an event E and a surrounding event zone 110. As described herein, the occurrence of the event may be determined in various ways, including by one of the sensors, and/or as reported by a human observer.

Figure 2:
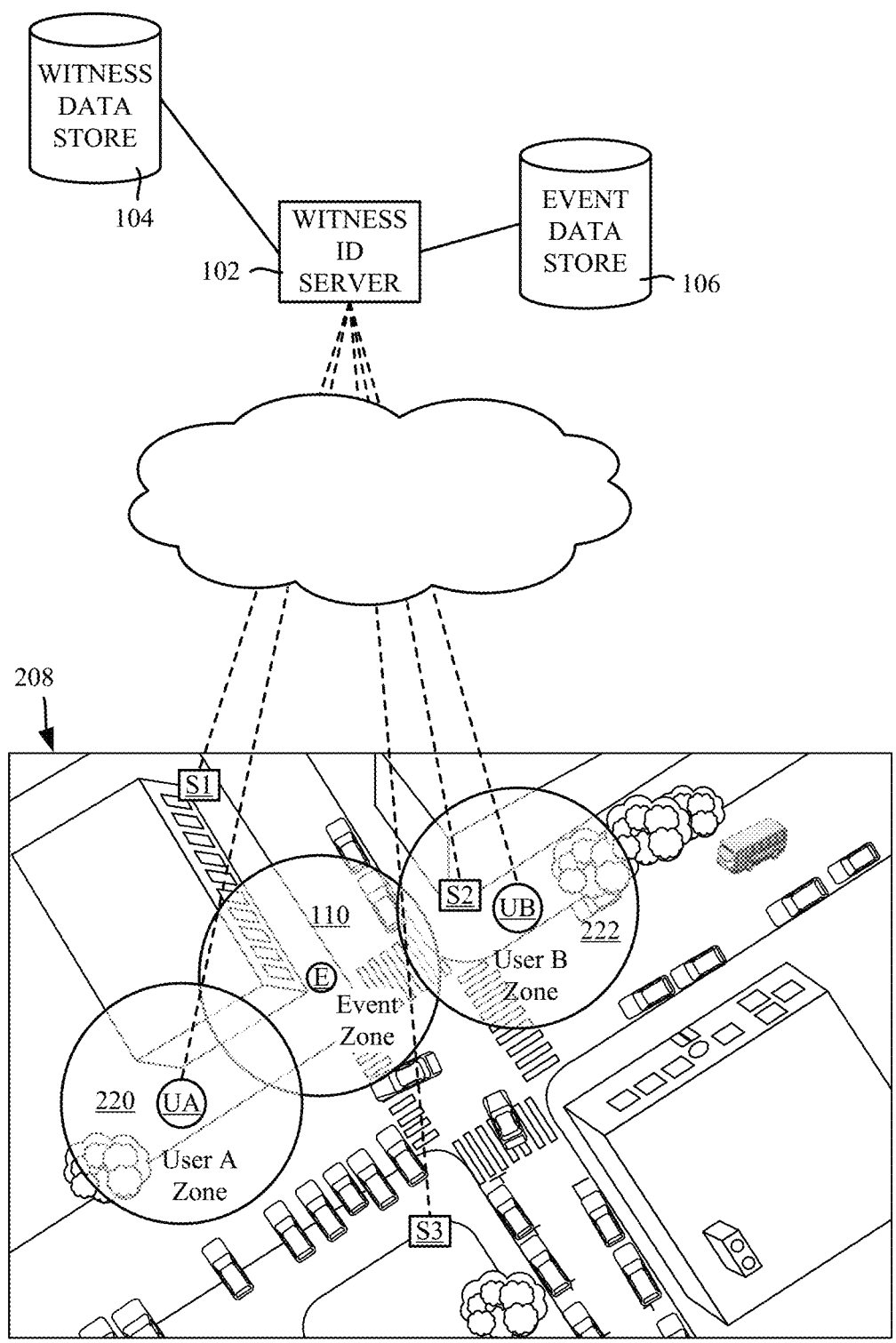
FIG. 2 is a block diagram of an example system and example representation of a zone in which an event occurred relative to zones of potential witnesses, in accordance with various aspects and embodiments of the subject disclosure.

As shown in FIG. 2 in the modified representation 208, there may also exist, at a given time, one or more users with the geographic area. Two such users, User A (UA) and User B (UB) are depicted in FIG. 2, although it is understood that any number of users may be present in a given scenario. Each user may be equipped with a communication device (not explicitly depicted), such as a smartphone, smartwatch, or other. The devices may be location-aware and have the capability to communicate with the witness ID server 102, such as via a witness ID application program (not explicitly depicted) and/or via other software, such as within the device operating system. Settings on the device may optionally permit the users to opt-in or opt-out to the witness ID capability. Note that a witness can be anon-human device, such as a camera, microphone or other sensor; indeed, one or more of the sensors S1-S3 may be a potential witness to the event E.

Figure 3:
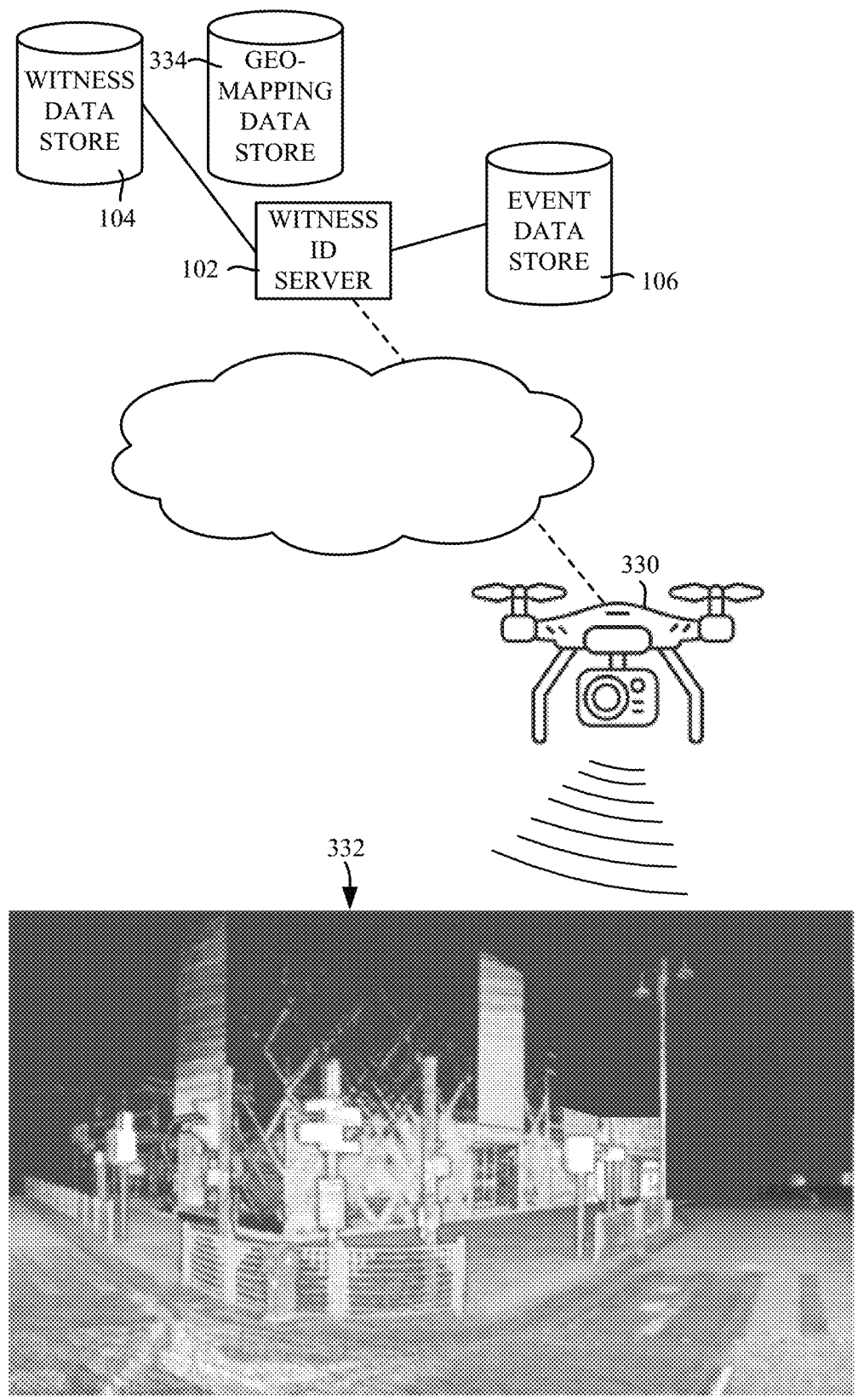
FIG. 3 is a block diagram of an example system and representation of a three-dimensional map of an area in which an event occurred, in accordance with various aspects and embodiments of the subject disclosure.

As shown in the example of FIG. 3, a geographic area may be mapped, for example, using a LIDAR- (light detection and ranging) capable (or similar) device, such as the unmanned aerial vehicle 330 to create a point cloud, with each point containing x, y, and z coordinates to create a three-dimensional map 332 of the area. The points, or ranges of points, may be stored in a geo-mapping data store (e.g., database) 334 to create a representation of physical points in space that exist within the area. As shown in FIG. 3, the geo-mapping data store 334 is coupled to the witness ID server 102.

Turning to detection of an event, the occurrence of an event within an area (or three-dimensional space) may be detected in various ways. As set forth herein, one or more of the sensors (e.g., S1-S3) may detect the event, such as a motion sensor sensing a motion or a motion satisfying specific criteria (such as a collision), a video camera sensing captured content that satisfies specific criteria (e.g., an intruder entering a closed business), or a microphone sensing captured content that satisfies specific criteria (a gunshot detection system). The detection of an event may also require more than one such occurrence, e.g., both a camera and motion sensor may need to detect an event of interest to avoid a false alarm.

In any case, the witness ID server 102 may collect data received from such sensors (e.g., S1-S3) and make the determination from the sensors that an event has occurred. The event may also be detected based on an explicit declaration of an event by an alerting party, such as shown in the example representation 408 of FIG. 4 (via the arrow pointing to the event E). The alerting party may be equipped with a GPS-capable communication device that may be used to send an alert or alarm, such as a panic button. The alerting party may be a person or a device, and in general may be considered to be a potential witness, although separate data (not shown) may be maintained for the alerting party or parties.

Figure 4:
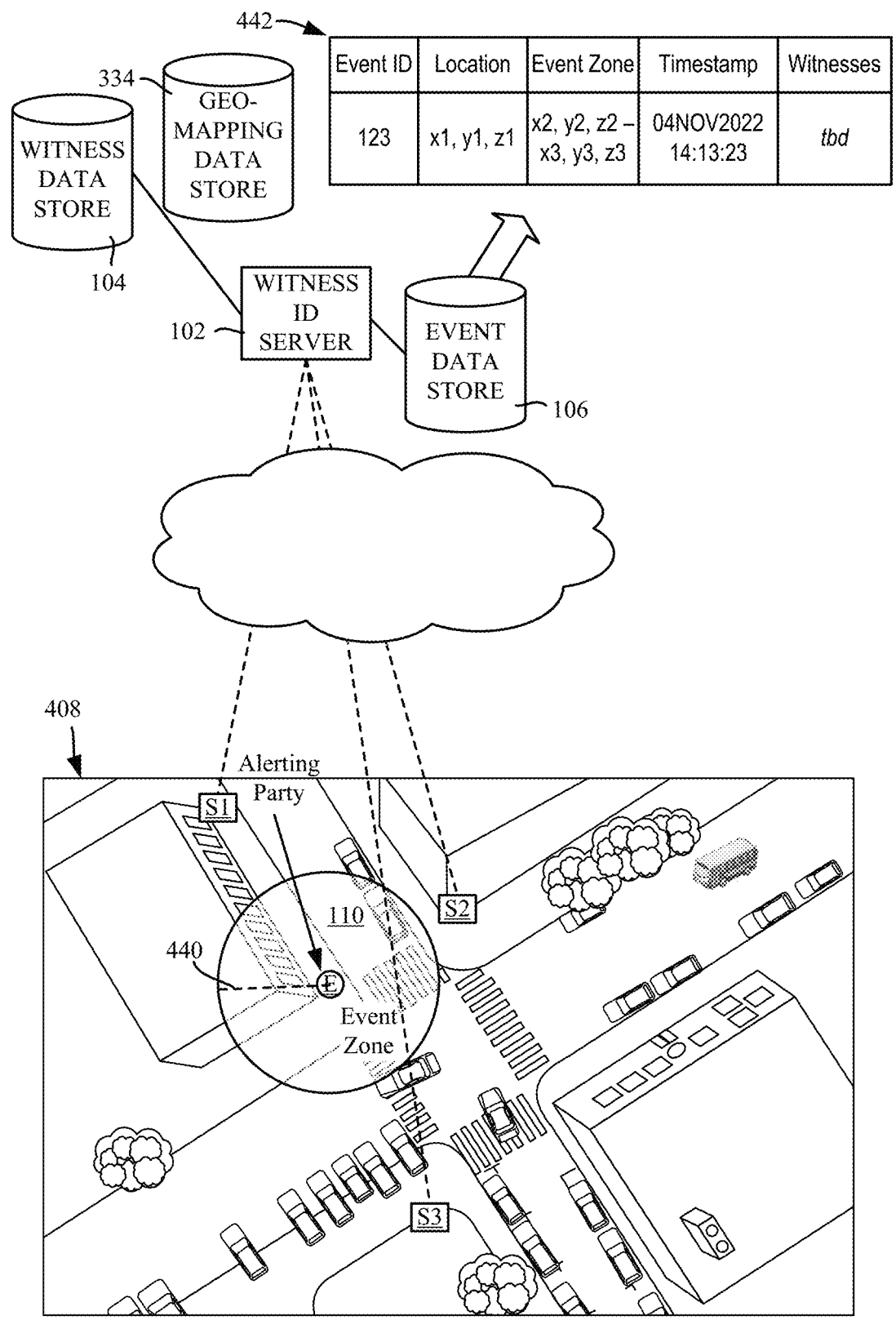
FIG. 4 is a block diagram of an example system and example representation of establishment of an event zone based on a received alert, resulting in an event data structure data entry being established, in accordance with various aspects and embodiments of the subject disclosure.

Because the sensors and/or alerting party have location-aware capabilities, a location of the event, in x, y, z coordinates may be established. Using the event coordinates as a center point, for example, the event zone 110 may be established. The event zone 110 may comprise of a set of x, y, z coordinates that emanate radially from the event location, e.g., as represented in FIG. 4 by the dashed line 440, to create a partial (or possibly complete) sphere. Other algorithms or the like may also be used to create the event zone points in space.

The event zone 110 can be used as a first approximation of an area/volume in which potential witnesses may be identified. The value of the event zone radius 440 may be preset, or the radius may be dependent upon factors as specified and analyzed by the witness ID server 102. For example, if the ambient light levels, as detected by the sensors, indicate that the area is dark, the radius may be shorter. As another example, an event such as a vehicle that strikes a number of other vehicles over some distance may have a larger event zone than a two-vehicle collision (although in the alternative a multi-car collision can be considered multiple events).

When an event is detected, a data structure entry 442 (e.g., a database record) of the event may be created in the event data store 106. The example event entry in FIG. 4 shows an event ID, the event's location, the event zone coordinates (although a radius can also be used in conjunction with the location to establish the zone), and timestamp. Note that although not explicitly shown in FIG. 4, the timestamp field may store timestamps for a range of times, such as for an event that spans some duration.

Figure 5:
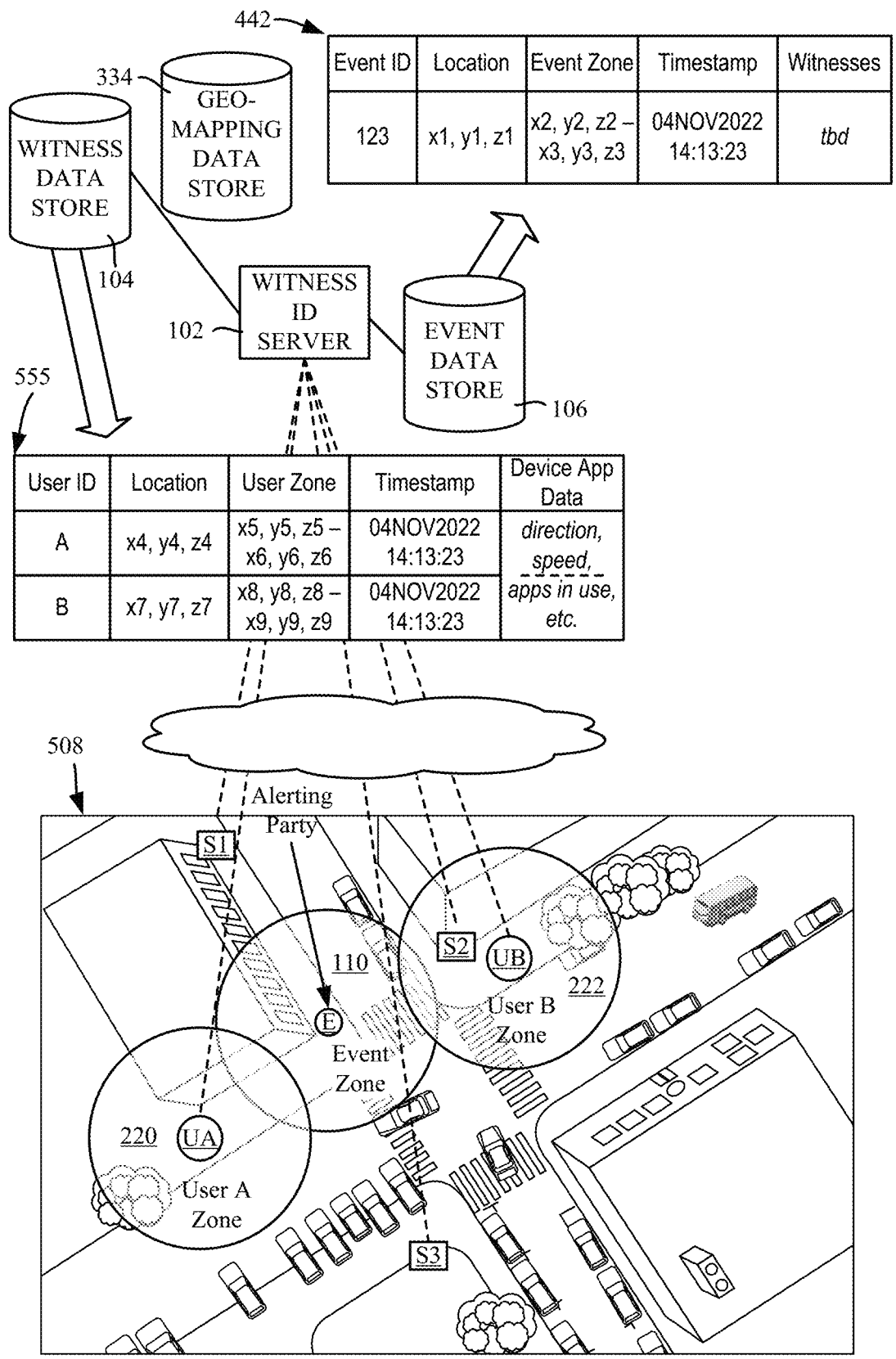
FIG. 5 is a block diagram of an example system and example representation of establishment of user zones based on an established event, resulting in witness data structure data entries being established, in accordance with various aspects and embodiments of the subject disclosure.

The event zone 110 may therefore represent an area/space that is a potential range from the event location E within which a user may be identified as a potential witness to have seen or heard anything related to the event. Note that the user need not have been located within the event zone 110 at the time of the event. Rather, as shown in FIG. 5, if the user's own zone of perception overlaps the event zone, he or she may be identified as a potential witness. Similarly, a camera and/or microphone witness may have captured relevant evidence in the event zone based on the camera's and/or microphone's capabilities. For purposes of the following example, human witnesses are described, however it is understood that these are non-limiting examples, and any entity capable of capturing and/or providing relevant evidence data is herein defined to be a potential witness.

For a user, at a point in time, a user's location may be known based on the location of his or her device at that time. In a manner similar to creating the event zone, a user zone may be established for each user's device that is determined to be within the geographic area of the event. That is, based on the timestamp of the event, any potential user devices within an area proximate to the event location may be identified. This is shown in the example representation 508 of FIG. 5 via the user zone 220 for the User A (UA) and the user zone 222 for the User B (UB). The location of the user devices may be determined based on GPS, cell tower triangulation, or other techniques.

With the user location(s) known, other data from the user devices may be retrieved from the user devices, such as the direction of travel of each user, speed of travel, and data describing use of capabilities of the device at the time of the event, such as whether a camera on the device was active at the time of the event, or when the microphone was active, whether a call was in progress, or others. The user zone for each user may be defined by a range of functionality of capabilities of their device—for example, based on the sensitivity of a microphone on the device or the visual range and quality of a camera on the device. Alternatively, or in addition to device capability data, the user zone for a user may be defined by the user's own visual or hearing capabilities, which may be set by the user manually—e.g., via setting on their or learned using machine learning techniques, analyzing the user's use of their device over time. Therefore, the size of user zones may vary.

As also shown in FIG. 5, data entries (e.g., records) in the example data structure 555 of the witness data store 104 may be saved for the users and their respective user zones. These records may be saved at any time, including for times not initially associated with event occurrences. That is, it may not be determined until a later time that an event occurred at a location, whereby the need to determine the presence of users near the location may be discovered at a time after the occurrence of the event. For example, if the occurrence of the event is not detected by an automated means, such as sensor readings, but rather reported later, then it is useful to go back in time to when the event occurred to determine nearby potential witnesses at the event time. For an event with a generally unknown starting time, a time range from some likely possible starting time (reasonably before the event likely occurred) to when it was determined to have occurred may be used. Thus, an entry in the witness data store 104 may have multiple user zones each associated with a timestamp, or a zone associated with a range of timestamps, with some reasonable sampling frequency used (e.g., dependent on each user's speed) to keep the maintained amount of data reasonable. In the alternative, multiple records can be maintained per user, e.g., one per zone and associated timestamp.

Figure 6:
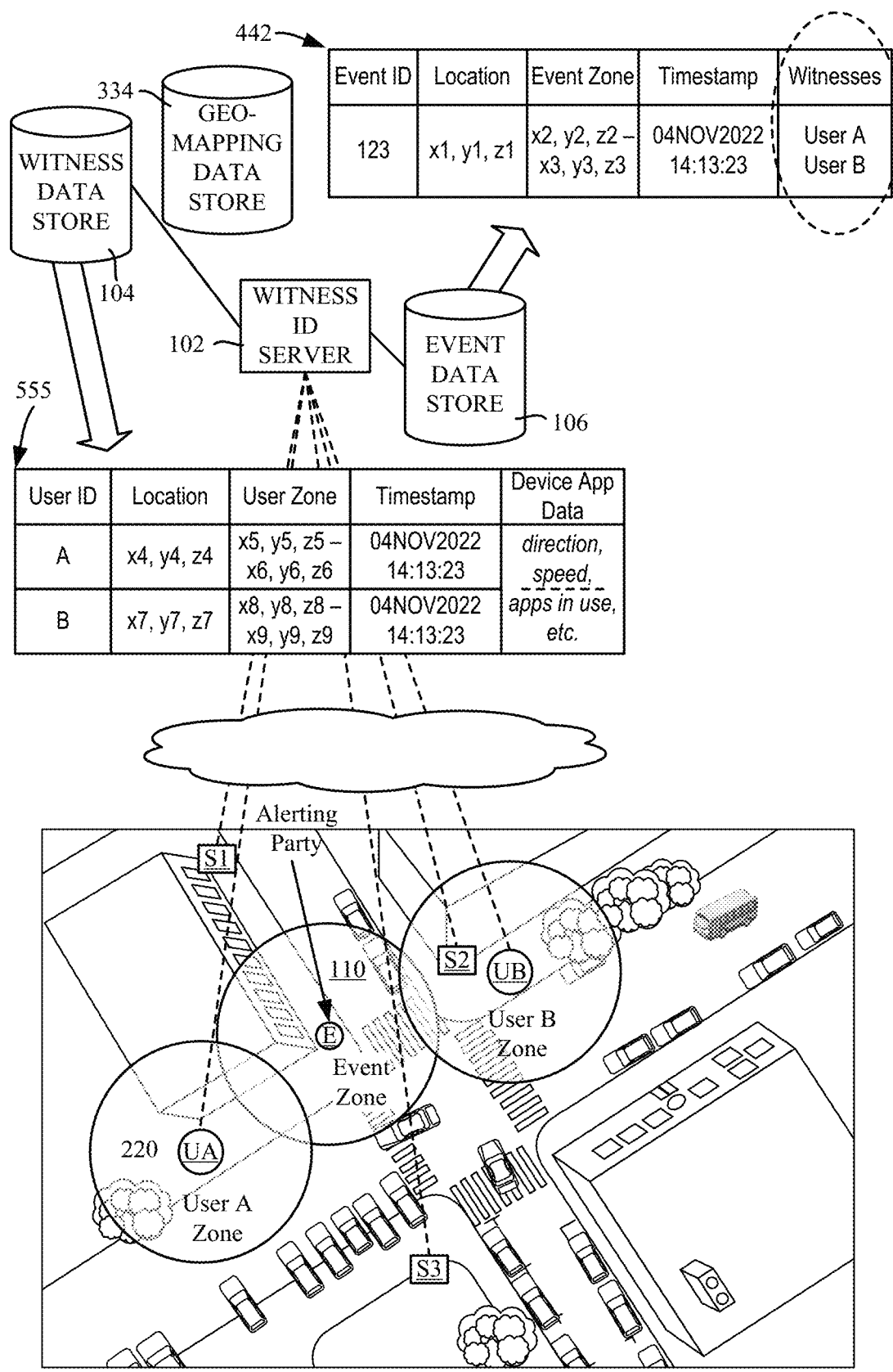
FIG. 6 is a block diagram of an example system and example representation of determining potential witnesses based on user zones overlapping an event zone, resulting in an event data structure being updated with witness data, in accordance with various aspects and embodiments of the subject disclosure.

To determine potential witnesses within range of the event, the witness ID server 102 compares the coordinate points of the event zone with the coordinate points of the user zones. If a sufficient number or a range of points is in common, (e.g., the user and event zones sufficiently overlap), the user may be identified as a potential witness of the event and recorded in the event data store 106 as such. Note that FIG. 6 shows the user identifiers User A and User B included in the event data store's data structure 442, as highlighted via the dashed ellipse to emphasize the update relative to the state depicted in FIG. 5.

The witness ID server may use the device app data or the like in the witness data store's data structure 555 to further analyze the users to determine whether they may be a witness. For example, if the data indicates that a user's device was traveling at sixty miles-per-hour in a direction away from the event location, that user (and/or the user's dashboard camera) may be excluded as a potential witness, or assigned a lower witness priority.

Figure 7:
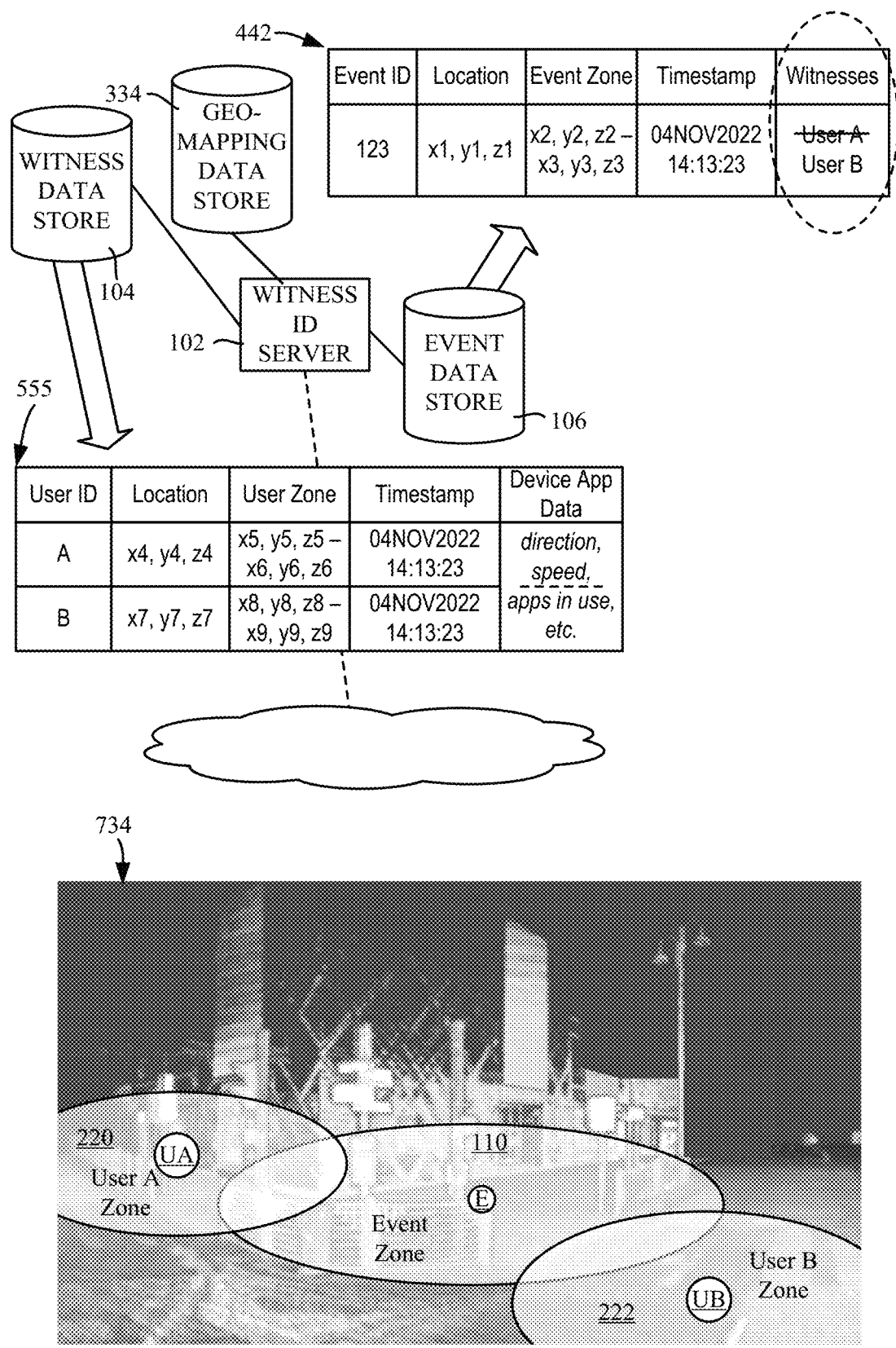
FIG. 7 is a block diagram of an example system and example representation of a potential witness being eliminated from further consideration based on field of view data for that potential witness, in accordance with various aspects and embodiments of the subject disclosure.

It is also useful to evaluate the field of view for each potential witness that may have seen the event. The witness ID server 102 may access the geo-mapping data store's data to determine whether a sufficient number of points exist in space between a user's location and the event or the event zone. For example, the witness ID server may calculate which points are in a line of sight between the user location for user 1 and the event or the event zone. In the case shown via the representation 734 in FIG. 7, for example, user A's field of view may be determined to be too obstructed by the building such that an insufficient number of field of view coordinates exist for user A to be a likely witness to the event E. Therefore, even though user A's zone sufficiently overlaps with the event zone 110, their field of view was likely too obstructed and therefore the zones are not considered to appropriately intersect, whereby User A is unlikely be a witness to the event. This is indicated in FIG. 7 by the strikethrough of User A in the event data structure 442. In contrast, the User B remains intact in the event data structure 442 as a potential witness because the User B's view was not obstructed.

Note however that the User A may have heard something, depending on the loudness of the type of event, that is, the User A's zone intersects with respect to audio sensing of the event. Thus, if the User A may have been able to hear something relevant to the event, it may be more useful to assign the User A to a lower priority level with respect to being a potential witness, rather than discount User A as a potential witness entirely.

Figure 8:
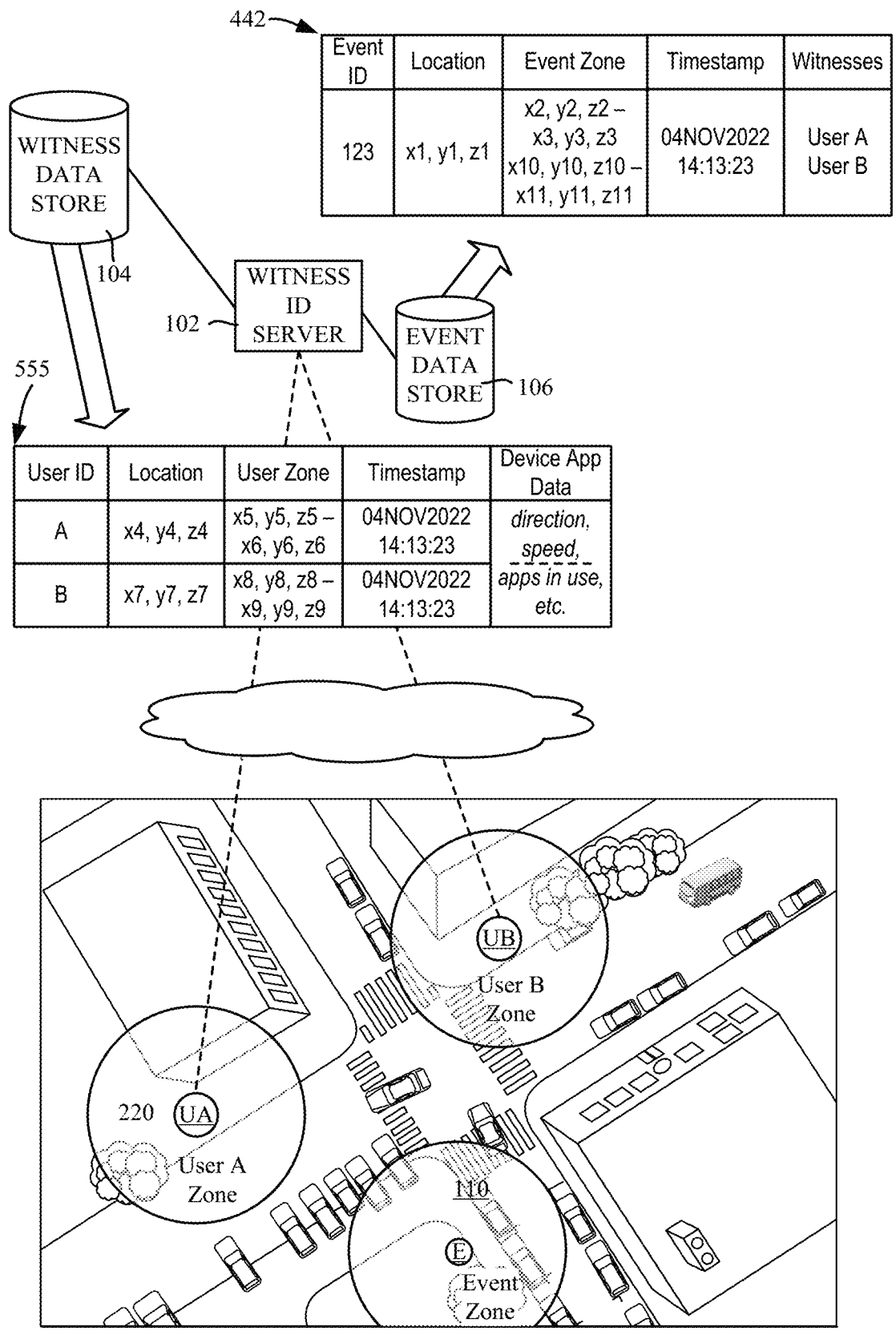
FIG. 8 is a block diagram of an example system and example representation of an event zone that has moved over time, in accordance with various aspects and embodiments of the subject disclosure.

As depicted in FIG. 8 (relative to FIG. 6, for example), the location of the event E and the event zone 110 may change over time, e.g., a suspect may flee a crime or accident scene. As such, users may be identified as potential witnesses to the event only at specific point in time or over specific ranges of time. This data may be used to prioritize the identification of potential witnesses, e.g., users who are identified as potential witnesses for longer periods of time may be assigned a higher priority in the event database. Further, additional potential witnesses may be located relative to the changed event location, e.g., a hit-and-run vehicle may have its license plate captured by a camera not necessarily within or even very near the event zone. Note that witnesses can also move over time, e.g., a witness can follow a suspect, although this is not shown in FIG. 8.

Figure 9:
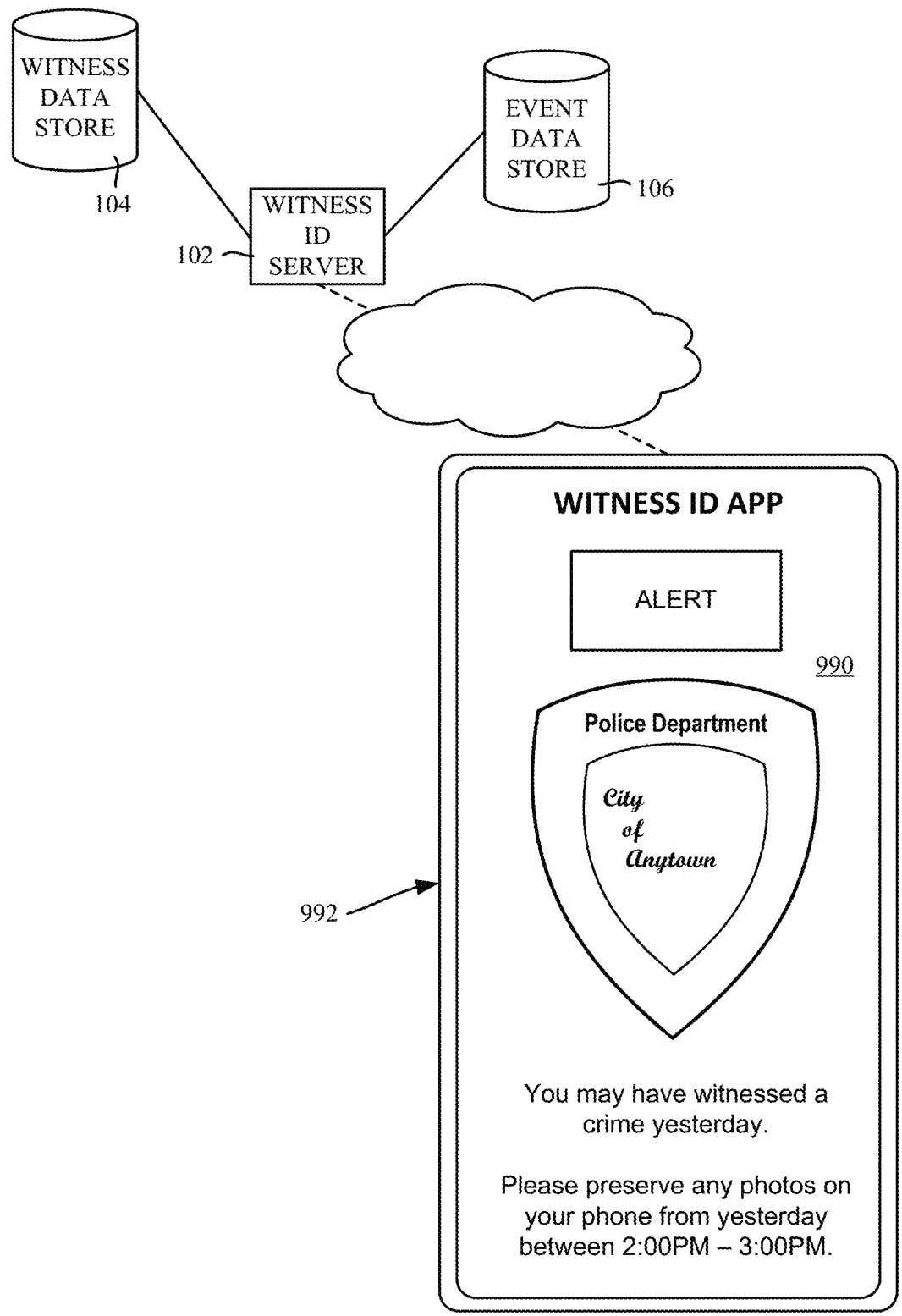
FIG. 9 is a block diagram of an example system and example representation of an alert sent to a potential witness of a prior event via a device of the potential witness, in accordance with various aspects and embodiments of the subject disclosure.

Turning to sending notifications to witnesses, any users who are identified as potential witnesses to the event may be notified by the witness ID server 102 via an alert message sent to the user's device, for example. For example, as shown in FIG. 9 via the user interface 990 of a user's witness identification application program, a notification can be rendered on the user device 992 of an identified potential witness.

Figure 10:
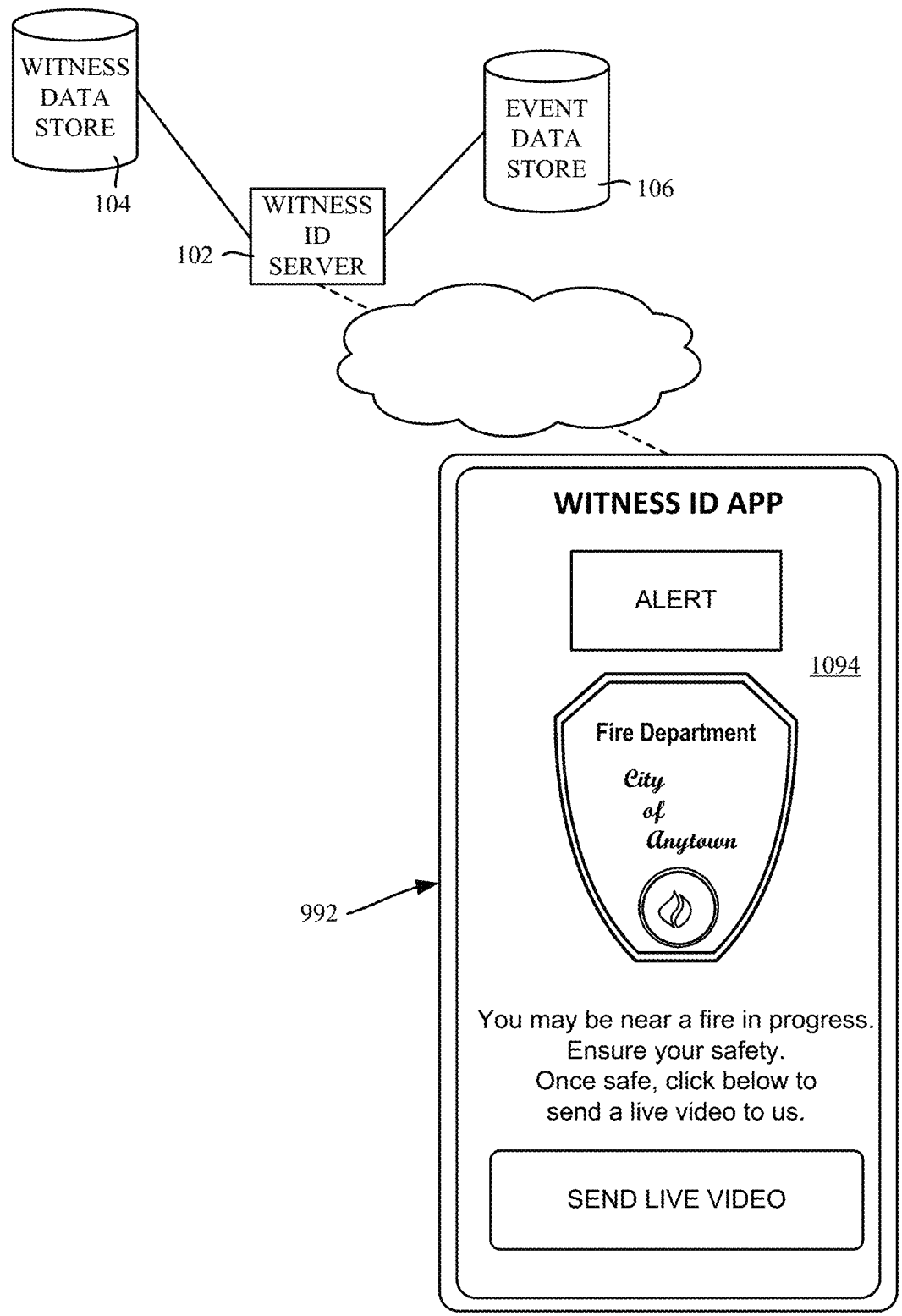
FIG. 10 is a block diagram of an example system and example representation of an alert sent to a potential witness of an ongoing event via a device of the potential witness, in which the potential witness is invited to collect data of the event, in accordance with various aspects and embodiments of the subject disclosure.

In some situations, users identified as potential witnesses to an event occurring in real time may also be offered an opportunity to assist in collecting additional data at the time of the event. The data collected may be sent in real time to the witness ID server by the user's device. For example, as shown in FIG. 10 via the user interface 1094 of a user's witness identification application program, a notification can be rendered on the user device 992 of an ongoing event, with an invitation to directly provide live evidence, e.g., to send live video in this example.

It should be noted that a non-human witness can be notified via a person or system in charge of the device/sensor. For example, a business may have a camera that captured an event; a notification (e.g., similar to FIG. 9 or via another communication such as a phone call) may be sent to the owner of the business requesting captured video/any audio over the event timeframe. For a live event, the owner or system may be requested to aim the camera at the ongoing event zone, possibly changing zoom, resolution and the like as appropriate to capture the live event.

Figure 11:
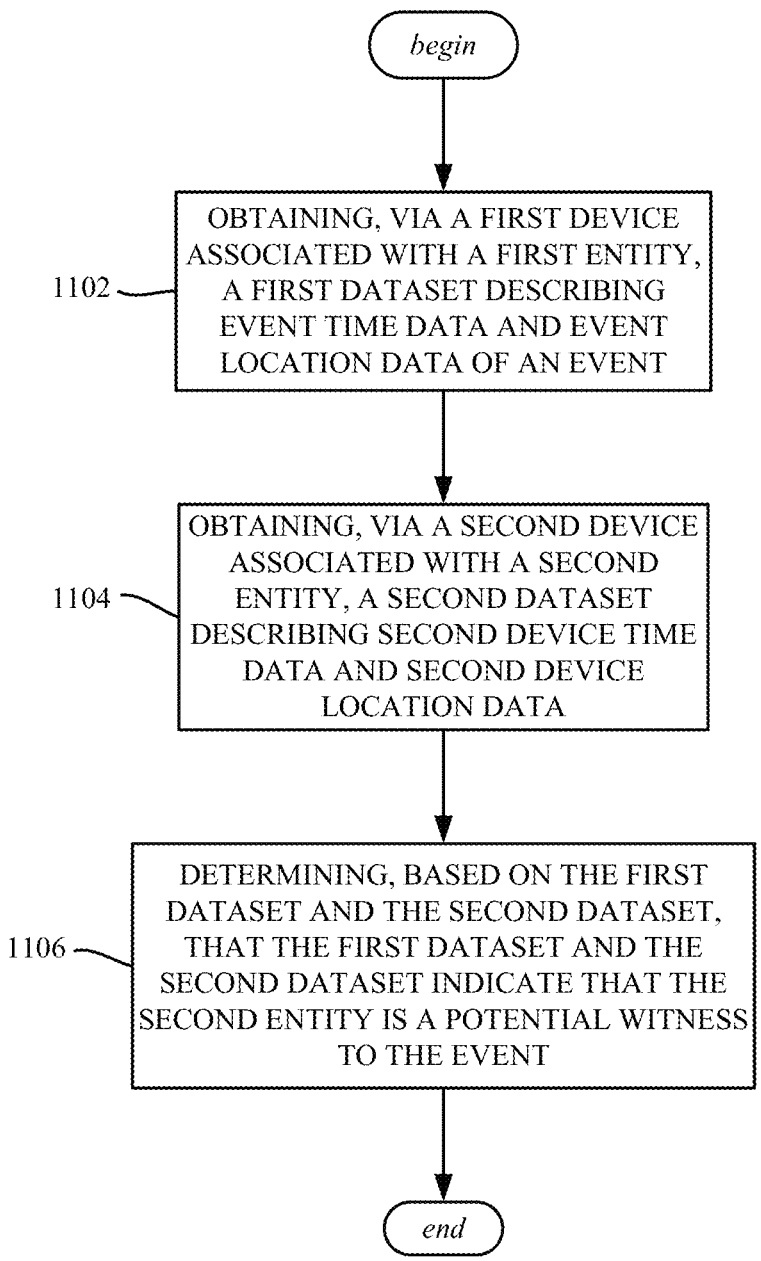
FIG. 11 is a flow diagram representing example operations related to determining, based on a first dataset describing an event and a second dataset describing an entity's location and time, that the second entity is a potential witness to the event, in accordance with various aspects and embodiments of the subject disclosure.

One or more example aspects are represented in FIG. 11, and can correspond to a system, including a processor, and a memory that stores executable instructions that, when executed by the processor, facilitate performance of operations. Example operation 1102 represents obtaining, via a first device associated with a first entity, a first dataset describing event time data and event location data of an event. Example operation 1104 represents obtaining, via a second device associated with a second entity, a second dataset describing second device time data and second device location data. Example operation 1106 represents determining, based on the first dataset and the second dataset, that the first dataset and the second dataset indicate that the second entity is a potential witness to the event.

Obtaining the first dataset can be triggered by a sensor.

The second entity associated with the second device can be a user of the second device.

Further operations can include defining a zone associated with the first dataset, and wherein a sensor associated with the first entity that senses activity in the zone.

Further operations can include defining, based on the event location data, a first zone associated with the first dataset, defining, based on the second device location data, a second zone associated with the second dataset; the determining that the first dataset and the second dataset indicate that the second entity is the potential witness to the event can include determining that the first zone and the event time data intersect with the second zone and the second device time data.

The event time data can represent a first duration, and the second device time data can represent a second duration. Determining that the first dataset and the second dataset indicate that the second entity is the potential witness to the event can include determining that a field of view of the second entity at a second device time represented by the second device time data encompasses the first zone. Determining that the first dataset and the second dataset indicate that the second entity is the potential witness to the event can include determining that the second entity at a second device time represented by the second device time data is capable of sensing audio generated within the first zone. Defining the second zone can be based at least in part on at least one of: first capability data representative of a first capability of the second device, or second capability data representative of a second capability of the second entity.

Further operations can include sending an alert message to the second device for output of the alert message by the second device.

Further operations can include receiving, from the second device and in response to the alert message, additional data describing the event other than represented by the first dataset or the second dataset.

The potential witness to the event can be a first potential witness, and further operations can include obtaining, via a third device associated with a third entity, a third dataset describing third device time data and third device location data, determining, based on the first dataset and the third dataset, that the first dataset and the third dataset indicate that the third entity is a second potential witness to the event, assigning a first priority level to the second potential witness based on the second dataset, and assigning a second priority level to the third potential witness based on the third dataset.

Figure 12:
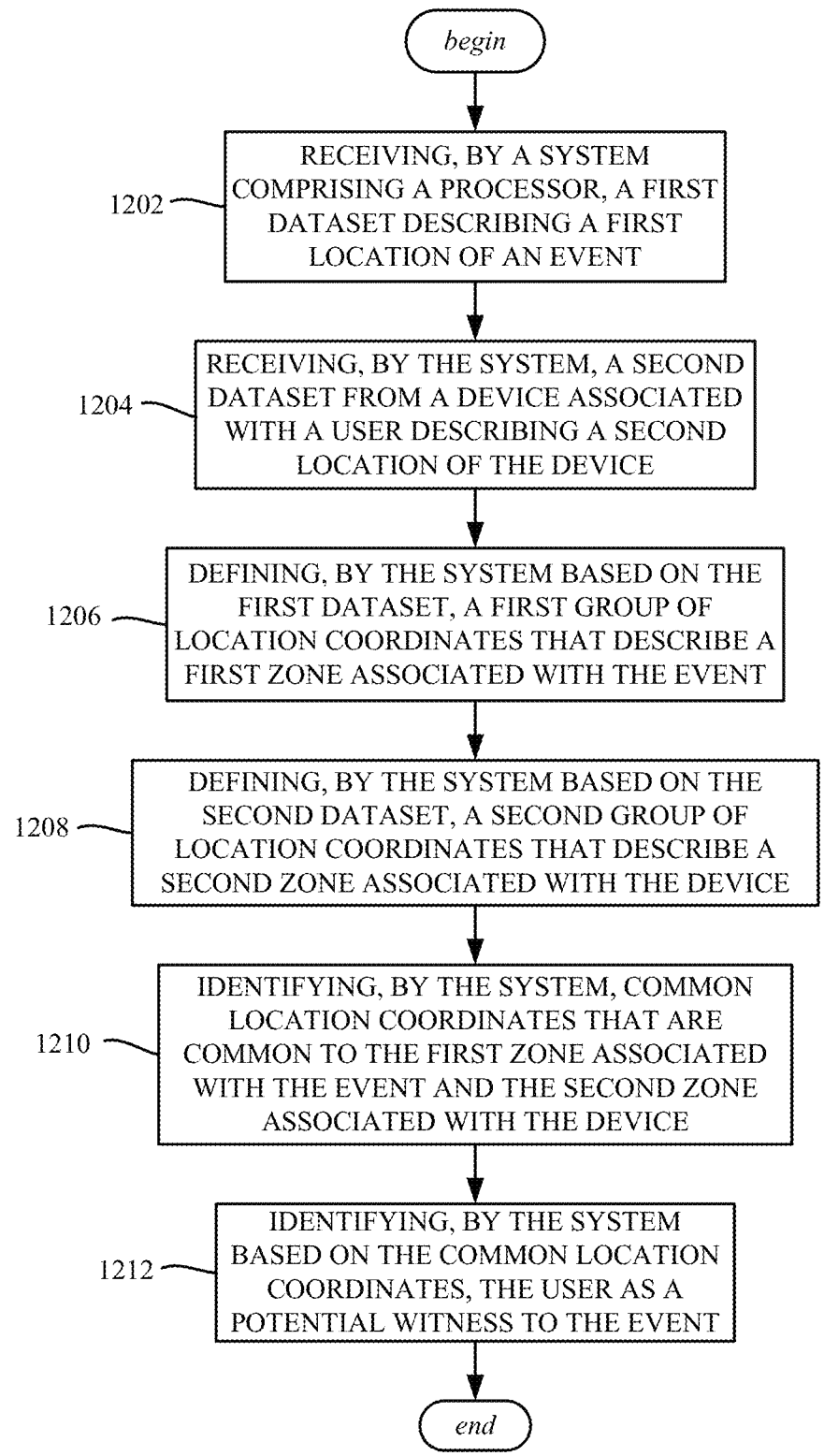
FIG. 12 is a flow diagram representing example operations related to identifying a potential witness to the event based on the common location coordinates of the user's device zone and an event zone, in accordance with various aspects and embodiments of the subject disclosure.

One or more example aspects are represented in FIG. 12, and, for example, can correspond to operations, such as of a method. Example operation 1202 represents receiving, by a system comprising a processor, a first dataset describing a first location of an event. Example operation 1204 represents receiving, by the system, a second dataset from a device associated with a user describing a second location of the device. Example operation 1206 represents defining, by the system based on the first dataset, a first group of location coordinates that describe a first zone associated with the event. Example operation 1208 represents defining, by the system based on the second dataset, a second group of location coordinates that describe a second zone associated with the device. Example operation 1210 represents identifying, by the system, common location coordinates that are common to the first zone associated with the event and the second zone associated with the device. Example operation 1212 represents identifying, by the system based on the common location coordinates, the user as a potential witness to the event.

Defining the second group of location coordinates that describe the second zone can include defining the second group of location coordinates based at least in part on at least one of: first capability data describing a first capability of the device, or second capability data describing a second capability of the user.

Further operations can include, based on the identifying of the user as the potential witness, sending, by the system to the device, an alert message for output by the device.

Further operations can include receiving, by the system from the device, additional data, not comprised in the first dataset or the second dataset, describing the event from the device in response to the alert message.

Figure 13:
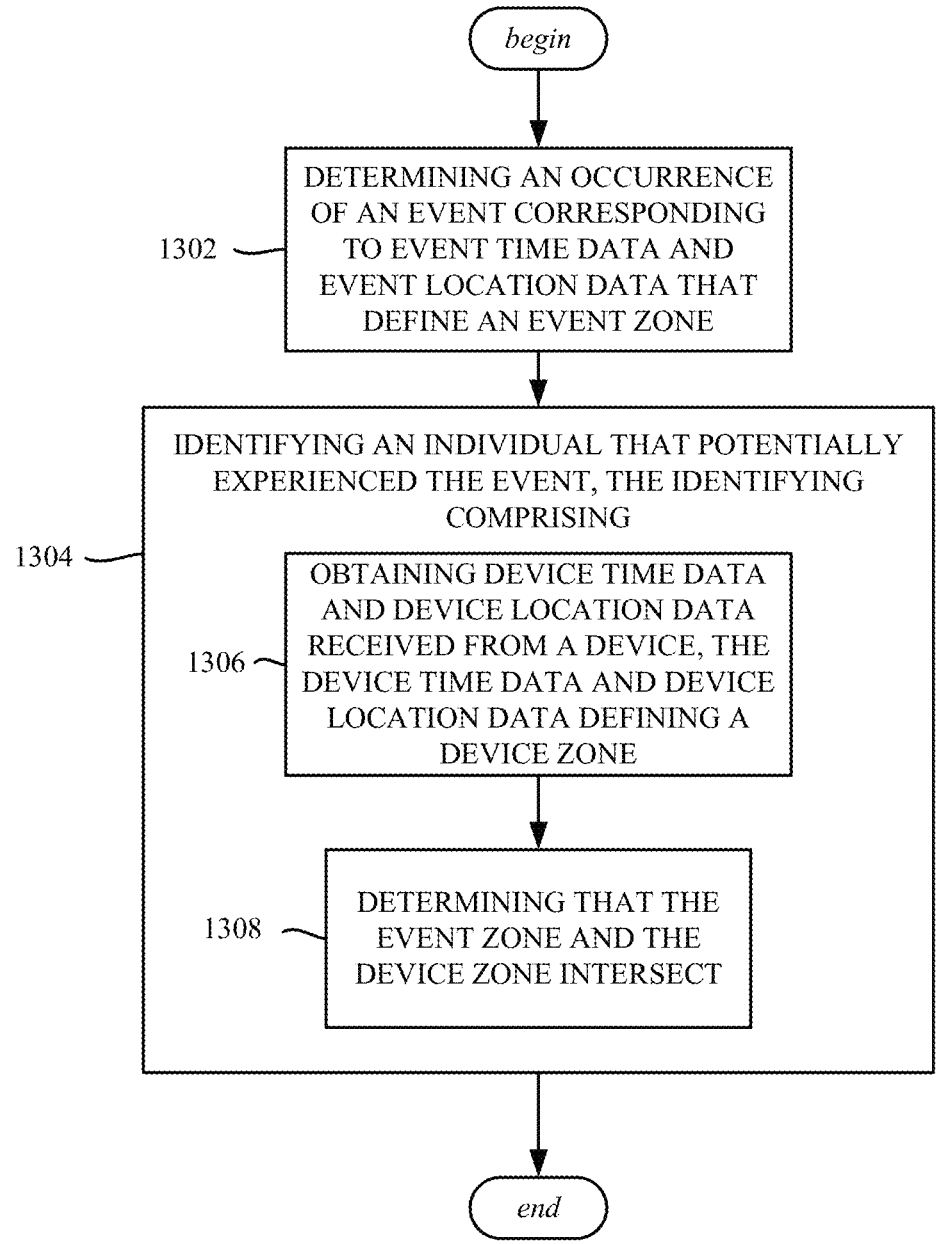
FIG. 13 is a flow diagram representing example operations related to identifying an individual that potentially experienced the event by determining that an event zone and the individual's device zone intersect, in accordance with various aspects and embodiments of the subject disclosure.

One or more aspects are represented in FIG. 13, such as implemented in a machine-readable medium, including executable instructions that, when executed by a processor, facilitate performance of operations. Example operation 1302 represents determining an occurrence of an event corresponding to event time data and event location data that define an event zone. Example operation 1304 represents identifying an individual that potentially experienced the event, the identifying comprising, obtaining device time data and device location data received from a device, the device time data and device location data defining a device zone (operation 1306), and determining that the event zone and the device zone intersect (operation 13086).

Obtaining the device time data and the device location data received from the device can include accessing a data store that maintains the device time data and the device location data, the accessing the data store occurring at a time that is later than an event end time identified by the event time data.

Determining that the event zone and the device zone intersect can include determining that the event zone is within at least one of: a first field of view associated with the device relative to the event, a second field of view of a user associated with the device relative to the event, an audio sensing range of the device, or an audio hearing range of the user associated with the device.

Further operations can include obtaining device operational data of the device with respect to the device zone, the operational data of the device comprising at least one of: device direction data representative of a direction associated with the device, device speed data representative of a speed associated with the device, device capability data representative of a capability associated with the device, or device active application program data representative of an active application program executing via the device, and wherein the operations further comprise evaluating the device operational data as part of the identifying of the individual that potentially experienced the event.

As can be seen, the technology described herein facilitates an efficient way to identify potential witnesses to an event, and efficiently notify the potential witnesses. By tracking the device locations and times of devices, potential witnesses to an event can be identified by intersection of their zones with an event zone. Even witnesses that are unaware that an event of interest occurred nearby can be located.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beam-forming, and codebook-based precoding can also be used to address issues such as efficiency, interference, and range.

Figure 14:
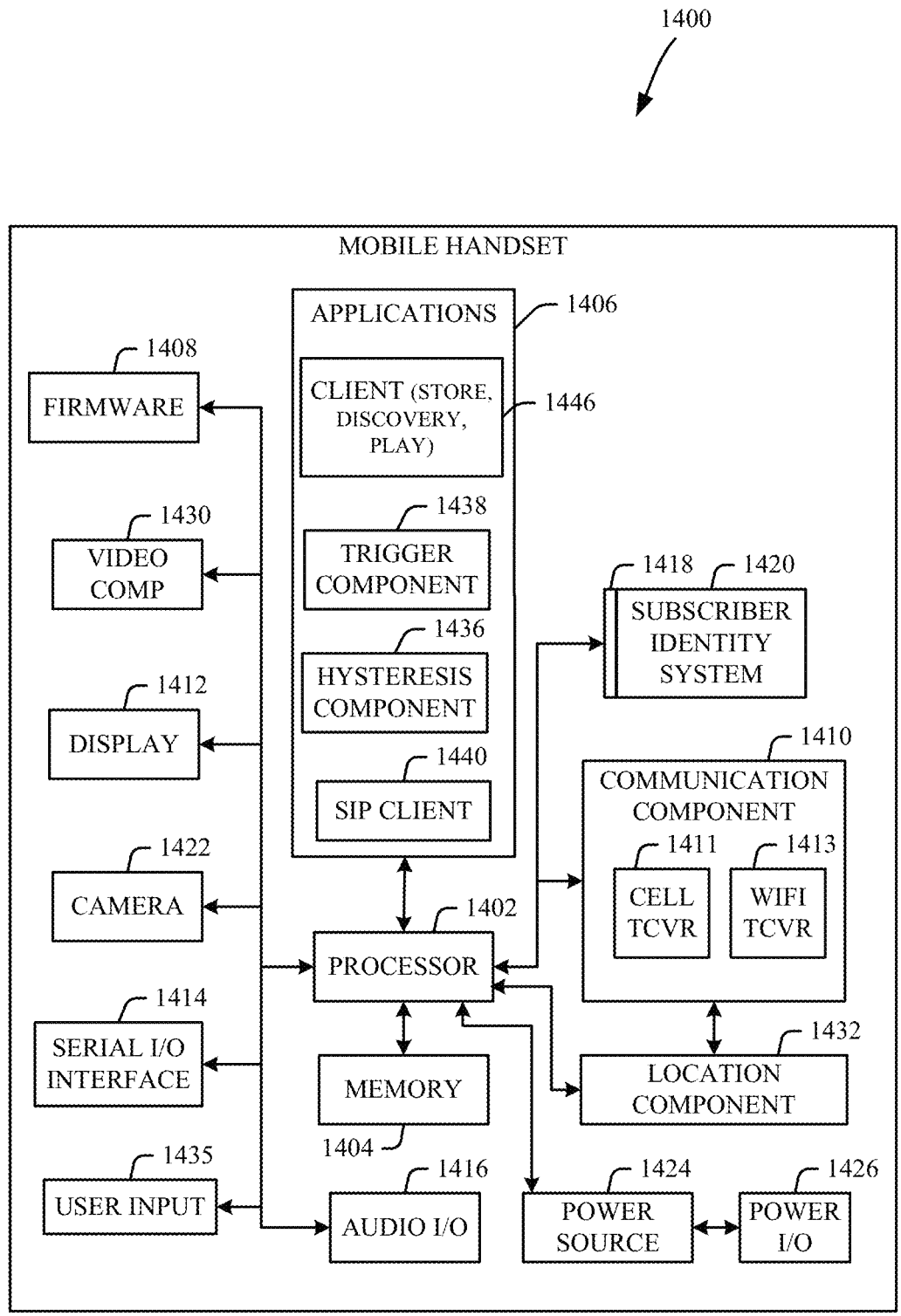
FIG. 14 illustrates an example block diagram of an example mobile handset operable to engage in a system architecture that facilitates wireless communications according to one or more embodiments described herein.

Referring now to FIG. 14, illustrated is a schematic block diagram of an example end-user device (such as user equipment) that can be a mobile device 1400 capable of connecting to a network in accordance with some embodiments described herein. Although a mobile handset 1400 is illustrated herein, it will be understood that other devices can be a mobile device, and that the mobile handset 1400 is merely illustrated to provide context for the embodiments of the various embodiments described herein. The following discussion is intended to provide a brief, general description of an example of a suitable environment 1400 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, main-frame computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1494) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1422 (e.g., a camera) can be provided for decoding encoded multimedia content. The video processing component 1422 can aid in facilitating the generation, editing and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 810, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
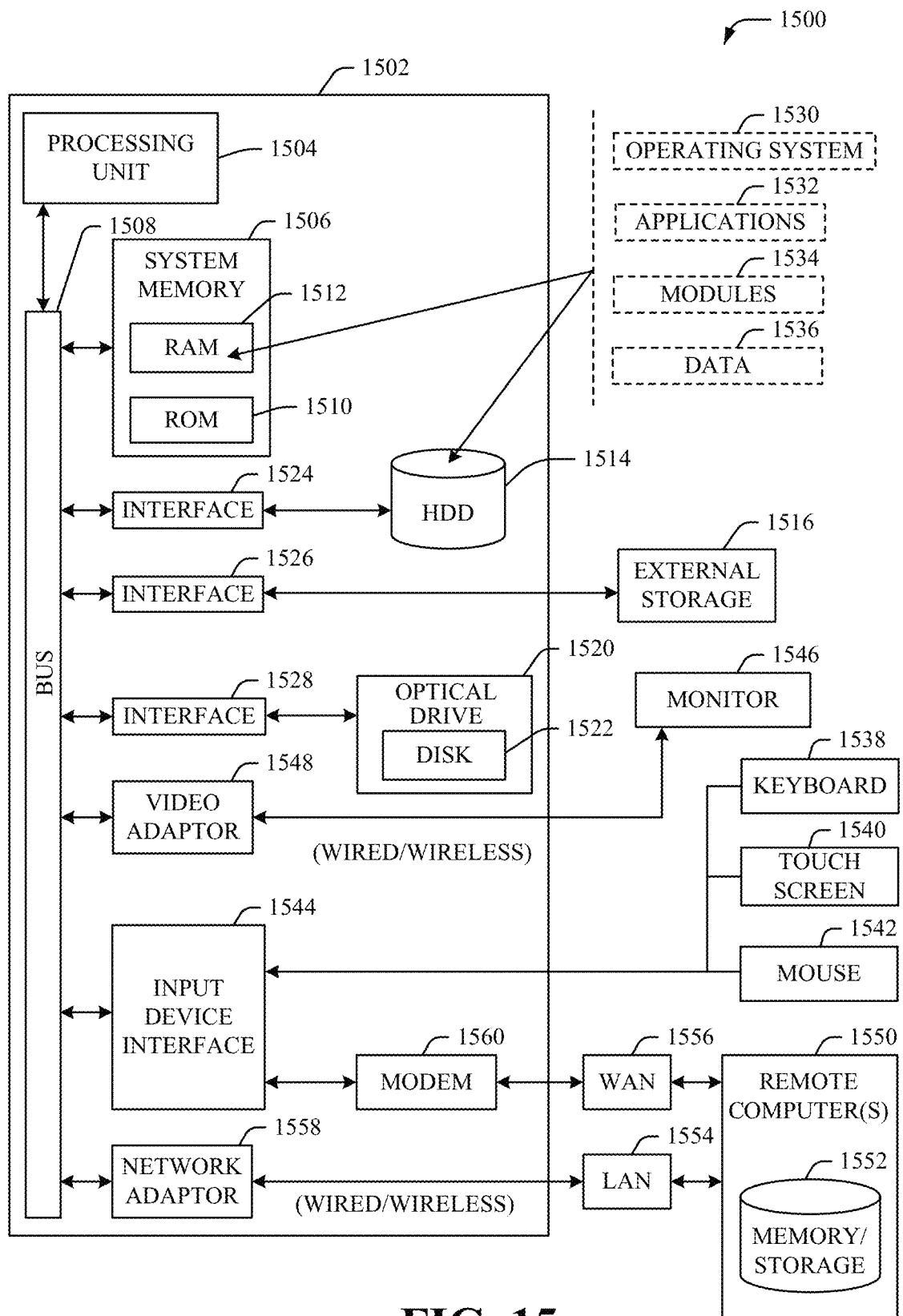
FIG. 15 illustrates an example block diagram of an example computer/machine system operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD), non-volatile memory and other storage technology could be used in addition to, or in place of, an HDD 1514, and can be internal or external. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally include emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can include one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 15 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor of the system, facilitate performance of operations, the operations comprising:
   obtaining, via a first device associated with a first entity, a first dataset describing event time data representing a first duration and event location data of an event;
   defining, based on the event location data, a first zone associated with the first dataset;
   obtaining, via a second device associated with a second entity, a second dataset describing second device time data representing a second time duration and second device location data;
   defining, based on the second device location data, a second zone associated with the second dataset; and
   determining, based on the first dataset and the second dataset, that the first dataset and the second dataset indicate that the second entity is a potential witness to the event, including determining that the first zone and the event time data intersect with the second zone and the second device time data.

2. The system of claim 1, wherein the obtaining of the first dataset is triggered by a sensor.

3. The system of claim 1, wherein the second entity associated with the second device is a user of the second device.

4. The system of claim 1, wherein the operations further comprise defining a zone associated with the first dataset, and wherein a sensor associated with the first entity that senses activity in the zone.

5. The system of claim 1, wherein the determining that the first dataset and the second dataset indicate that the second entity is the potential witness to the event comprises determining that a field of view of the second entity at a second device time represented by the second device time data encompasses the first zone.

6. The system of claim 1, wherein the determining that the first dataset and the second dataset indicate that the second entity is the potential witness to the event comprises determining that the second entity at a second device time represented by the second device time data is capable of sensing audio generated within the first zone.

7. The system of claim 1, wherein the defining of the second zone is based at least in part on at least one of: first capability data representative of a first capability of the second device, or second capability data representative of a second capability of the second entity.

8. The system of claim 1, wherein the operations further comprise sending an alert message to the second device for output of the alert message by the second device.

9. The system of claim 8, wherein the operations further comprise receiving, from the second device and in response to the alert message, additional data describing the event other than represented by the first dataset or the second dataset.

10. The system of claim 1, wherein the potential witness to the event is a first potential witness, and wherein the operations further comprise obtaining, via a third device associated with a third entity, a third dataset describing third device time data and third device location data, determining, based on the first dataset and the third dataset, that the first dataset and the third dataset indicate that the third entity is a second potential witness to the event, assigning a first priority level to the second potential witness based on the second dataset, and assigning a second priority level to the second potential witness based on the third dataset.

11. A method, comprising:
    receiving, by a system comprising a processor, a first dataset describing a first location of an event;

receiving, by the system, a second dataset from a device associated with a user describing a second location of the device;

defining, by the system based on the first dataset, a first group of location coordinates that describe a first zone associated with the event;

defining, by the system based on the second dataset, a second group of location coordinates that describe a second zone associated with the device, wherein the defining the second group of location coordinates comprises defining the second group of location coordinates based at least in part on at least one of: first capability data describing a first capability of the device, or second capability data describing a second capability of the user;

identifying, by the system, common location coordinates that are common to the first zone associated with the event and the second zone associated with the device; and identifying, by the system based on the common location coordinates, the user as a potential witness to the event.

12. The method of claim 11, further comprising, based on the identifying of the user as the potential witness, sending, by the system to the device, an alert message for output by the device.

13. The method of claim 12, further comprising receiving, by the system from the device, additional data, not comprised in the first dataset or the second dataset, describing the event from the device in response to the alert message.

14. A non-transitory machine-readable medium, comprising executable instructions that, when executed by a processor, facilitate performance of operations, the operations comprising:

determining an occurrence of an event corresponding to event time data and event location data that define an event zone; and identifying an individual that potentially experienced the event, the identifying comprising:

obtaining device time data and device location data received from a device, the device time data and device location data defining a device zone, and determining that the event zone and the device zone intersect, wherein the determining that the event zone and the device zone intersect comprises determining that a field of view associated with the device encompasses the event zone.

15. The non-transitory machine-readable medium of claim 14, wherein the obtaining of the device time data and the device location data received from the device comprises accessing a data store that maintains the device time data and the device location data, the accessing the data store occurring at a time that is later than an event end time identified by the event time data.

16. The non-transitory machine-readable medium of claim 14, wherein the determining that the event zone and the device zone intersect comprises determining that the event zone is within at least one of: a first field of view associated with the device relative to the event, a second field of view of a user associated with the device relative to the event, an audio sensing range of the device, or an audio hearing range of the user associated with the device.

17. The non-transitory machine-readable medium of claim 14, wherein the operations further comprise obtaining device operational data of the device with respect to the device zone, the operational data of the device comprising at least one of: device direction data representative of a direction associated with the device, device speed data representative of a speed associated with the device, device capability data representative of a capability associated with the device, or device active application program data representative of an active application program executing via the device, and wherein the operations further comprise evaluating the device operational data as part of the identifying of the individual that potentially experienced the event.

18. The non-transitory machine-readable medium of claim 14, wherein the determining that the event zone and the device zone intersect comprises:

analyzing a plurality of spatial coordinates corresponding to the event zone and the device zone to identify an overlapping region.

19. The non-transitory machine-readable medium of claim 14, wherein the determining that a field of view associated with the device encompasses the event zone comprises:

determining the field of view associated with the device based on geo-mapping data that includes information regarding physical obstructions present between the device and the event zone.

20. The non-transitory machine-readable medium of claim 14, wherein the operations further comprise:

determining a timestamp based on the device time data; and comparing the timestamp with an event-associated timestamp to determine a temporal overlap.

* * * * *